United States Patent [19]

Kelch et al.

[11] 3,885,751

[45] May 27, 1975

[54] TAPE CARRIER FOR RECORD TAPES AND THE LIKE

[75] Inventors: Heinz Kelch, Buchenberg; Hilmar Kirchgessner; Eduard Schuh, both of Villingen, all of Germany

[73] Assignee: Kienzle Apparate GmbH, Villingen, Germany

[22] Filed: Mar. 26, 1974

[21] Appl. No.: 454,819

[30] Foreign Application Priority Data

Mar. 29, 1973 Germany ........................... 2315717

[52] U.S. Cl. ............................... 242/74.1; 242/74.2

[51] Int. Cl. ............................................ B65h 75/28

[58] Field of Search .......................... 242/74.1, 74.2

[56] References Cited

UNITED STATES PATENTS

| | | | |
|---|---|---|---|
| 653,796 | 7/1900 | Ettinger | 242/74.2 |
| 707,098 | 8/1902 | Garrison | 242/74.2 |
| 1,209,593 | 12/1916 | Keiser | 242/74.1 |
| 2,390,894 | 12/1945 | Morse | 242/74.1 |

OTHER PUBLICATIONS

IBM Technical Disclosure Bulletin, Vol. 12, No. 8, January, 1970, Web Attachment Clip, R. G. Gross, et al.

*Primary Examiner*—Edward J. McCarthy
*Attorney, Agent, or Firm*—Michael S. Striker

[57] ABSTRACT

A tape, for example a record tape, is clamped onto a core by a clip which embraces the core. Between peripherally spaced ends of the clip, a core portion extends outwardly, by a radial distance approximately equal to the thickness of the clip, to provide a substantially cylindrical support surface for the tape to be wound onto the core and clip.

9 Claims, 3 Drawing Figures

PATENTED MAY 27 1975 3.885,751

TAPE CARRIER FOR RECORD TAPES AND THE LIKE

BACKGROUND OF THE INVENTION

The invention relates to a tape carrier or reel of the type wherein a core has one end of a tape secured thereto to allow winding of the remainder of the tape onto the core and unwinding of said remainder from the core. Such a reel can serve for example for the winding of a magnetic tape, punched tape, film for graphic records or for photographic purposes, also an ink tape for typewriters, and the like. The tape is usually wound onto a core so as to facilitate handling of the tape, including insertion thereof into a recording device and removal of the tape from such device. It is usual in some applications to provide such core with flanges on their sides to protect the edges of the tape, but the use of flanges is not strictly necessary in a number of applications, for example when wound record tapes are stored in cartridges. In all cases, however, it has been a problem how to fasten the inner end portion of the tape to the core. Various constructions for such fastenings are known. For example, it has been usual to insert the end of the tape into a slot formed on the core; to hook the end of the tape onto a hook or a finger provided on the core; or to cement the end of the tape to the core, with or without the aid of an auxiliary cementing strip.

Difficulties have been encountered with these known constructions. In many cases the inner end of the tape was not connected to the tape with sufficient firmness, and the tape then slipped relative to the core incident to the winding process and sometimes also incident to the normal transport of the tape in the use thereof. In some cases the inner end of the tape was even torn off from the core. It has also been found in the use of some known constructions that the tape connections produced non-cylindrical forms of the innermost tape windings, leading to uneven forms of the entire tape winding or coil, which in turn has led to objectionable unevenness in tape transport and to equally objectionable unevenness in tape conditions, particularly pressure marks in inner coils of pressure sensitive tapes. Difficulties of these types have been encountered mainly in the important case in which tape was coiled and uncoiled in repetitive backward and forward motions.

The indicated difficulties have been recognized for a long time. In addition it has long been desired, mainly for mass fabrication of tape reels, that the inner end of the tape be not only fastened to the core by a simple and reliable means, but that these means also be constructed in such a way as to allow adjustment of tape tension pursuant to the attaching of the tape and prior to the coiling of the same. It has been proposed for example to effect such adjustment by the application of tension in the direction of the transported tape, to tighten the tape to the desired tension.

A tape carrier introduced in recent times, has a resilient fastener, for fastening the inner end of a magnetic tape to a core portion, the fastener being constructed so that it provides a detent in a recess, formed in the core, and that the fastener supplements the form of the core in such a way that the two together form a cylindrical body, thereby preventing the formation of noncircular tape coils. This kind of fastener has made it possible to evenly coil and uncoil the tape and to maintain proper fastening of the tape to the core in this process. However, the clamping surface, provided in this relatively advanced tape reel, was relatively small. Therefore it was necessary to apply very considerable clamping forces for properly holding the tape to the core. This in turn has often interfered with proper mounting of the fastener, and has made it difficult or sometimes impossible to adjust the tape tension in the direction of the tape transport, unless tearing off of the tape became all too probable, incident to the tightening of the tape. Still further it was difficult to manipulate the relatively small fastener. It was generally impossible to remove this fastener from a tape reel with flanges, except with very special tools or subject to dangers of impairment of the tape coils, or of the core.

SUMMARY OF THE INVENTION

It is an object of the invention to overcome the aforementioned difficulties and to solve the problems which have been outlined.

It is another object to provide a tape carrier for recording tapes and the like, whereto the tape can be fastened simply, firmly, evenly, and with adjustable tension.

It is a further object to provide a tape carrier of the afore-mentioned type, with an accurately cylindrical core surface, and which facilitates the attaching of the tape, the adjusting of tape-holding forces, and the replacing of the tape.

The objects have been achieved by combining a tape carrier core with an elastic fastener in the form of a clip embracing this core. In a preferred embodiment the core has a tape winding surface comprising two coaxial, circumferentially consecutive, cylinder segments of different radii. Advantageously the cylinder segment having the smaller radius extends peripherally over more than 180°. It is further preferred to dimension the outer surface of the elastic fastening clip, embracing the core, so as to equal the radius of the cylindrical core segment having the greater radius.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
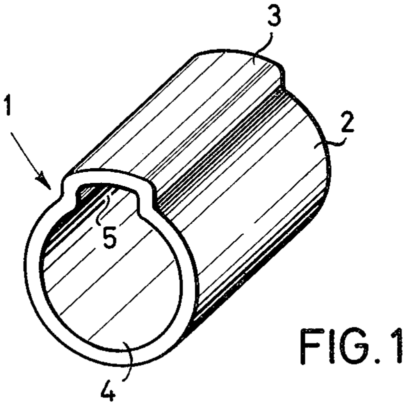
FIG. 1 is a perspective view of a tape core, forming part of the invention.
Figure 2:
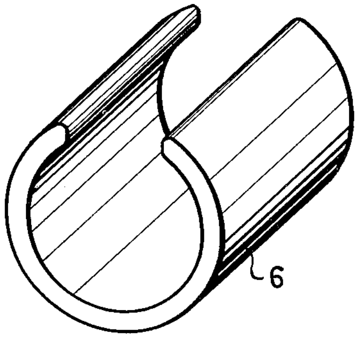
FIG. 2 is a perspective view of a tape clamping clip, forming another part of the invention.

Referring first to FIGS. 1 and 2 the new tape carrier is shown as comprising a core 1 the outside surface of which includes a cylinder segment 2 of relatively small radius and preferably extending peripherally over more than 180° about the axis of core 1. This segment is supplemented by a cylinder segment 3 of somewhat longer radius and of smaller peripheral extension, which completes core 1 to its peripheral extension of 360° about the axis. It will be seen that core 1 thus comprises a radially small and peripherally large core body 2 and a radially larger and peripherally smaller core portion 3 which extends outwardly from said core or rib body.

Figure 3:
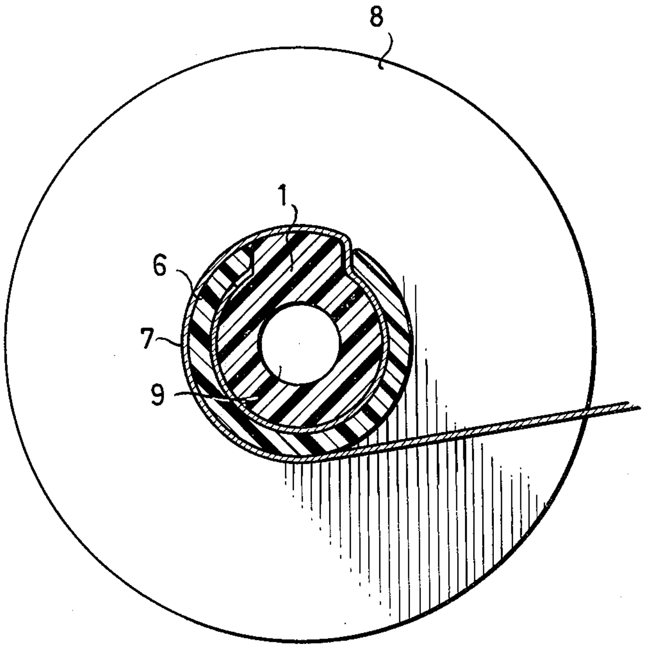
FIG. 3 is a cross sectional view of a slightly modified device according to the invention.

In order to fasten a tape to core 1, an end portion of the tape is wound around core body 2, as is generally indicated by an inner arcuate portion of a heavy line, shown in FIG. 3. Clip 6 is then attached to core 1 so as to clamp the tape to core body 2. Clip 6 according to the invention has the form of an annular cylinder segment, extending peripherally around at least a major part of the circumference of core body 2 or in other words, embracing this core body. The thickness of clip 6 substantially equals the difference between the radii of core cylinder segments 2 and 3.

Core 1 is shown as being hollow and as having substantially uniform wall thickness around its entire periphery, thereby facilitating production of the core from synthetic plastic material by injection molding processes or the like. This construction provides core 1 with a cylindrical bore 4 extending axially through core body 2 and having an extension in form of a groove 5 in core portion 3. It will be appreciated that this construction facilitates the rotary driving of core 1 both in the fabrication of the complete tape coil and in the operation of such a coil in a recording device or the like.

It will also be seen that clip 6, as well as core portion 3, extends along the axis of the core, between edges parallel to this axis, the edges of core portion 3 being disposed between those of clip 6; and between one of the edges of clip 6 and the adjacent edge of core portion 3, an outwardly extending tape portion extends from the innermost coil of the tape to its next outer coil. By virtue of the described and illustrated forms and dimensions, this next outer coil and all successive coils of the tape are supported by a substantially cylindrical tape carrier surface, coaxial with the central bore 4 of core 1 and thus assuring even coiling of the tape. This construction also allows adequate clamping of the inner end portion of the tape to the core, with relatively slight clamping forces which act over a relatively large core surface in form of the cylinder segment which defines core body 2. The relatively soft, elastic clip 6, which can be used accordingly, is advantageously engaged with the innermost tape coil and thereby with the core, by radial clamping motion.

It will be understood that the use of uniform wall thicknesses, illustrated in FIG. 1, is not strictly required for all devices in accordance with this invention. Instead of the single groove 5 a plurality of narrower grooves (not shown) can be formed with inwardly extending ribs therebetween, to define the inner surface of a central bore. It is also possible to provide internal threads or similar provisions for fastening the core to a rotatable shaft (not shown). As a further example FIG. 3 shows a central bore 9 of cylindrical shape, without a groove extending into the outwardly extending core portion, and evidently this modified core can be rotated by a suitable center shaft (not shown), by being bolted between a shoulder of the shaft and a fastening nut threaded to the shaft. FIG. 3 also shows a lateral flange 8, extending radially outwardly from the core 1.

A number of advantages is obtained by the new construction and particularly by the use of a relatively extended clamping surface between core 1 and clip 6. Evidently this surface can be made with desired roughness, to thereby obtain a desired coefficient of friction between this surface and the tape. As the surface is relatively large, the clamping force provided by the clip can be kept relatively small. This and the excellent distribution of the clamping force, obtained by the new construction, has the effect that it becomes much simpler than in former constructions to protect the tape from slipping or tearing off, even when transport motions are intermittent or jerky, or when the tape is strongly tightened incident to the adjustment of tension. Similarly it becomes less probable that the clamping force of clip 6 will be seriously reduced by fatigue in the material of this clip. The construction also facilitates manipulation of the several parts, as clip 6 can be attached to core 1 and the innermost tape coil, and can also be removed therefrom, without any need for special tools. Adjustment of tape tension is also facilitated, particularly when a series of the new cores 1 are mounted next to one another on a common stub shaft, allowing attachment of a clip 6 to each core 1.

It will be understood that each of the elements described above, or two or more together, may also find a useful application in other types of tape carriers differing from the types described above.

While the invention has been illustrated and described as embodied in a tape carrier for record tapes and the like, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A tape carrier, particularly for carrying recording tapes, comprising a resilient clip of generally circular cross-section having a longitudinal axis and a first outer circumferential surface formed with an axial slot extending parallel to said axis, and bounded by edge portions of said clip; and a core body having a second outer circumferential surface and being adapted to be received within the confines of said clip by a snapping action so that an end portion of the tape may be clamped intermediate said second outer circumferential surface and said clip, said core body comprising a rib portion, having an arcuate surface portion and being received in said slot intermediate said edge portions, said rib portion projecting outwardly from said core body to an extent so as to form a substantially circumferentially complete configuration with said first outer circumferential surface, whereby the tape adjacent said clamped end portion which has been passed between said rib portion and one of said edge portions is passed over said arcuate surface portion in a smooth and continuous manner without pressure-marking the tape.

2. A tape carrier as defined in claim 1, wherein said core body and said rib portion are integral with one another.

3. A tape carrier as defined in claim 1, wherein said clip and said core portion have cylindrical-segmental outer peripheral surfaces of substantially the same radius.

4. A tape carrier as defined in claim 1, wherein said clip extends circumferentially more than 180 degrees about said axis.

5. A tape carrier as defined in claim 1, wherein said clip is radially engageable under adjustable tension with said end portion of the tape on said core body.

6. A tape carrier as defined in claim 2, including flange means secured to and radially extending from said core body.

7. A tape carrier as defined in claim 2, wherein said core body has a coaxial bore extending outwardly into said rib portion to form a groove therein, and has a substantially uniform wall thickness around said bore and groove.

8. A tape carrier as defined in claim 1, wherein said clip substantially consists of soft, elastic, synthetic plastic.

9. A tape carrier as defined in claim 1, wherein said core body and said rib portion are integral with one another and consist of synthetic plastic.

* * * * *